United States Patent [19]

Nayak et al.

[11] Patent Number: 5,311,390
[45] Date of Patent: May 10, 1994

[54] APPARATUS FOR PRECISE POSITIONING OF A TAPE HEAD AND PROGRAMMING THEREOF

[75] Inventors: Ashok B. Nayak, LaVerne; Jagmohan S. Kukreja, Claremont, both of Calif.

[73] Assignee: Conner Peripherals, Inc., San Jose, Calif.

[21] Appl. No.: 794,999

[22] Filed: Nov. 15, 1991

Related U.S. Application Data

[62] Division of Ser. No. 546,025, Jun. 29, 1990, Pat. No. 5,198,947.

[51] Int. Cl.⁵ .................. G11B 5/56; G11B 5/584; G11B 5/55; G11B 9/02
[52] U.S. Cl. ..................... 360/137; 360/109; 360/106; 360/78.02; 360/77.12; 356/345; 33/DIG. 21
[58] Field of Search ............ 360/78.02, 109, 106, 360/137, 78.13, 77.12, 77.06, 77.04, 72.2; 33/DIG. 21; 356/345

[56] References Cited

U.S. PATENT DOCUMENTS

| | | | |
|---|---|---|---|
| 3,458,259 | 7/1969 | Bagley et al. | 356/349 |
| 3,654,446 | 4/1972 | Gordon et al. | 364/571.05 |
| 4,000,510 | 12/1976 | Cheney et al. | 360/72.2 |
| 4,313,141 | 1/1982 | Yanagida et al. | 360/78.02 |
| 4,485,418 | 11/1984 | Bremmer | 360/77.04 |
| 4,589,037 | 5/1986 | Jen et al. | 360/77.04 |
| 4,750,069 | 6/1988 | McConica et al. | 360/109 |
| 4,858,039 | 8/1989 | Mintzlaff | 360/78.02 |
| 4,933,619 | 6/1990 | Chang | 360/77.06 |
| 4,982,295 | 1/1991 | Yakuwa et al. | 360/49 |
| 4,990,762 | 2/1991 | Taylor | 356/345 |
| 5,001,580 | 3/1991 | Aranovsky et al. | 360/77.12 |
| 5,011,280 | 4/1991 | Hung | 356/345 |
| 5,073,835 | 12/1991 | Sano et al. | 360/77.04 |

Primary Examiner—John H. Wolff
Assistant Examiner—Craig A. Renner

[57] ABSTRACT

The invention provides a device to facilitate precise positioning of a tape head at a particular track on a magnetic tape. Typically, the magnetic tape is adapted to be received in a drive assembly which has a memory and a motor. The device includes a mounting tray for receiving the tape drive assembly, and a laser beam emitted from a laser source. On the tape head of the device, a reflector is positioned and moves with the tape head. Beam directors are provided to ensure that the laser beam passes from the laser source to the reflector. The distance traveled by the tape head from a predetermined point to a position adjacent a track on the magnetic tape is accurately measured, and the extent of movement of the motor required to move the tape head through such a distance is also measured. Thereafter, the measurements are programmed into the tape drive assembly memory.

13 Claims, 11 Drawing Sheets

FIG. I

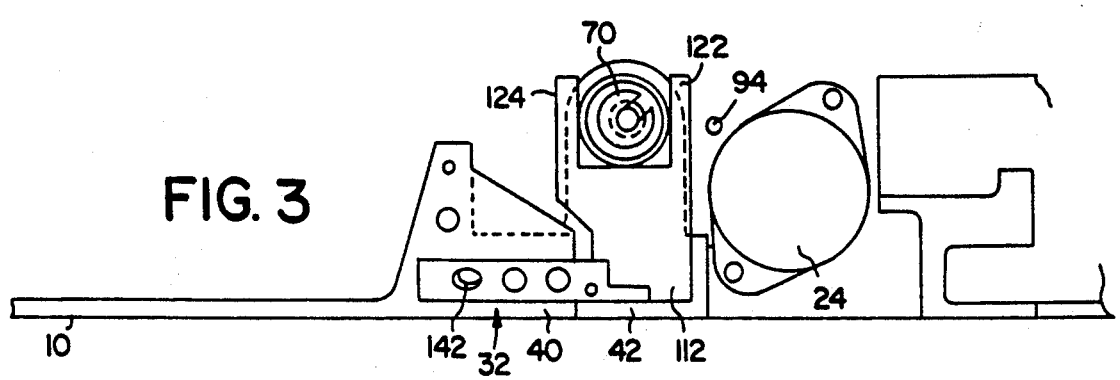
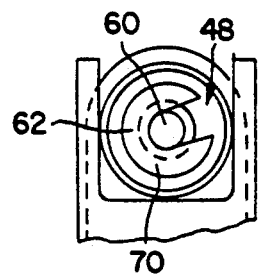
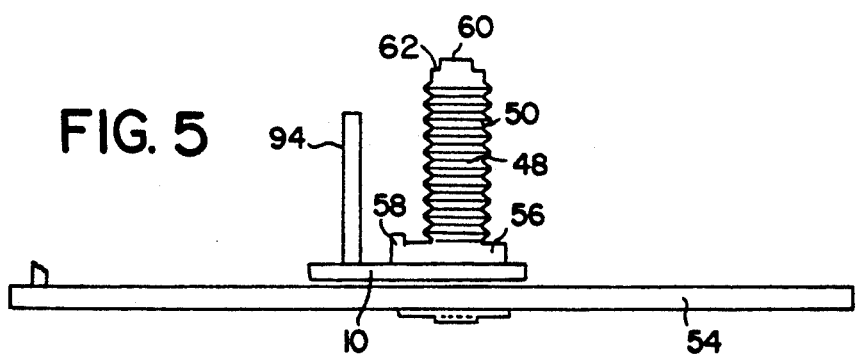

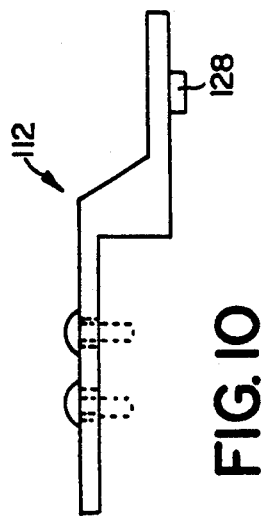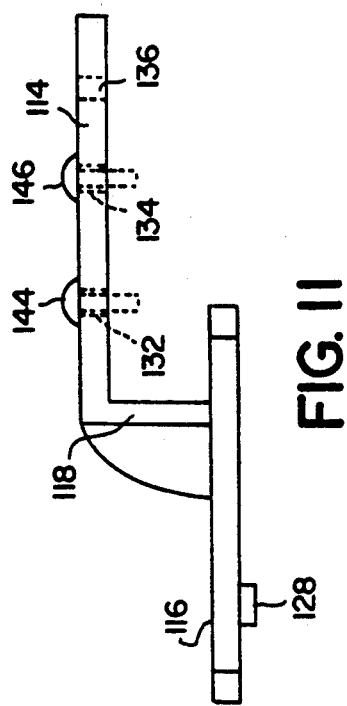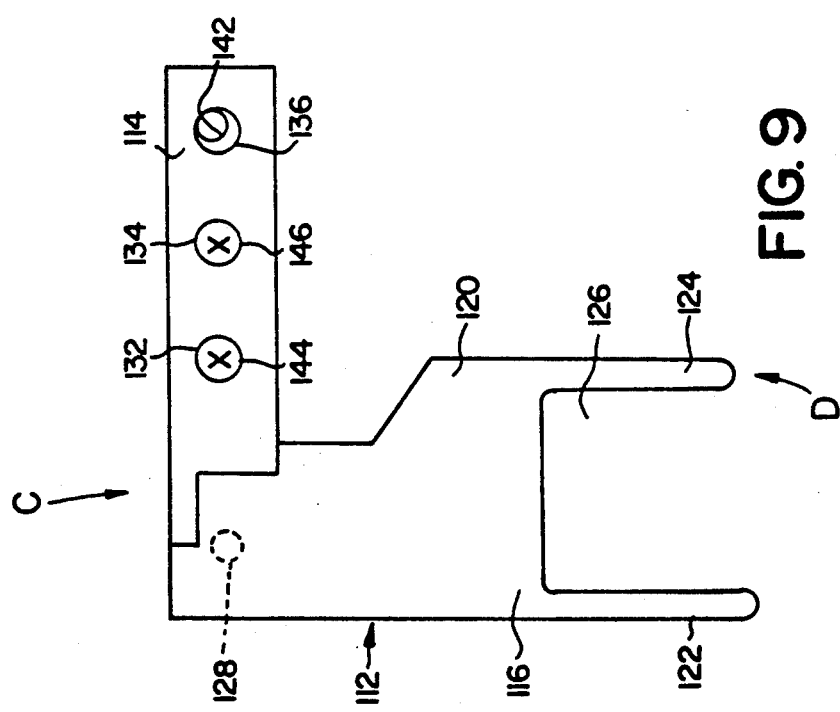

APPARATUS FOR PRECISE POSITIONING OF A TAPE HEAD AND PROGRAMMING THEREOF

This is a divisional of co-pending application Ser. No. 07/546,025 filed Jun. 29, 1990, now U.S. Pat. No. 5,198,947, issued Mar. 30, 1993.

BACKGROUND OF THE INVENTION

This invention relates to a method and apparatus for the positioning and setting of a magnetic head in a tape drive assembly for accurate tracking of magnetic tape contained in a cassette, the cassette being adapted to be received in the tape drive assembly.

The use of magnetic tape cassettes is common in the computer industry, where such magnetic tape has a defined width, and a number of tracks, wherein information can be written and subsequently read by appropriately positioned magnetic heads. There is a tendency to provide an increasing number of tracks on a strip of magnetic tape to maximize the amount of information which may be contained therein. As a result of this increasing number of tracks, it has become more and more critical that locating a particular track is carried out with speed and accuracy for precision reading of information contained in that track. By "locating" a particular track is meant that a magnetic read or write head be positioned with respect to the magnetic tape so that the head accurately and precisely corresponds with the track for efficient retrieval of the information thereon.

In order for the magnetic head to read from or write onto a track, it is necessary that the tape drive assembly provide a mechanism whereby the tape head can be displaced in a direction normal to the movement of the tape so that the tape head can move up and down across the width of the tape for the purposes of locating a track. Typically, a head carriage assembly is mounted on a spindle or shaft which may be rotated by a motor, the spindle being threaded and engaging a threaded bore in the head carriage assembly. Rotation of the spindle results in up and down movement of the magnetic head. In order to insure maximum read/write efficiency, the precise orientation and position of the magnetic head should be properly set, and the motor driving the head carriage assembly must be accurately programmed so as to stop the magnetic head in a manner which will cause it to directly register with or correspond to a desired track.

It is the purpose of the present invention to provide a method and apparatus which permit custom setting and programming of a particular tape drive assembly. The invention therefore relates to a method and apparatus which permit accurate setting of the orientation of the magnetic head on the carrier, as well as a method and apparatus designed to measure and program the tape drive assembly to accurately locate a particular track on the magnetic tape, taking into account the particular tolerances of the specific tape drive assembly.

SUMMARY OF THE INVENTION

According to one aspect of the invention, there is provided apparatus for orienting a magnetic tape head in a tape drive assembly adapted to receive a magnetic tape with tracks thereon, the apparatus comprising a frame having support means; a shaft member having an axis and mounted for rotation about its axis in the support means, the shaft member having a first end pivotably mounted on a first portion of the support means, and a second end mounted on a second portion of the support means and movable relative thereto, such movement causing pivoting of the shaft member at its first end; a motor connected to the shaft for rotating the shaft member about its axis; a head carriage assembly including magnetic tape head mounted on the shaft member, the head being positioned in the tape drive assembly such that the head lies adjacent magnetic tape adapted to be received in the tape drive assembly, the head carriage assembly being movable over the shaft member in response to rotation thereof whereby the head moves linearly in a direction substantially normal to movement of the tape to permit the head to locate and align with the tracks on the tape; and an adjuster member having a securing portion adapted to be moved with respect to and secured to the support, and a connecting portion adapted to engage and move the second end of the shaft member, whereby the movement of the securing portion adjusts the orientation of the shaft member and head carriage assembly, the securing portion being firmly secured to the support when the head is in a desired orientation.

The first portion of the support means may comprise a lower plate and the second portion of the support means comprises an upper plate, the first and second ends of the shaft member being located between the lower and upper plates of the support respectively. The lower plate preferably has a first aperture therein, and the upper plate preferably has a second aperture therein, the first and second apertures being axially aligned, wherein the first end of the shaft member is pivotedly mounted in the first aperture, and the second end of the shaft member is received in the second aperture and is movable therein.

The second end of the shaft member may be retained in the second aperture by a ring member, the ring member having an outer diameter less than the diameter of the aperture whereby the ring member and second end of the shaft member are movable in the second aperture.

Conveniently, the adjuster member is mounted on the upper plate, the adjuster member further comprising pivot means between the securing portion and the connecting portion thereof, movement of the securing portion pivoting the adjuster member about the pivot means to thereby adjust the position of the connecting portion and the ring member engaged thereto. The adjuster member may have its securing portion secured to the plate support by at least one clamping screw. The securing portion preferably has an adjusting aperture therein, the support means has a base aperture therein which partially registers with the adjusting aperture in the securing portion, the apertures being eccentric with respect to each other, the adjusting and base apparatus further comprising an adjusting tool adapted to extend through the adjusting aperture in the securing portion and engage the base aperture in the plate support, whereby pivoting of the adjusting tool in the base aperture causes the adjusting tool to engage walls defining the adjusting aperture in the securing portion, thereby moving the securing portion and the adjuster plate relative to the plate support.

Preferably, the connecting portion comprises two substantially parallel arms, the arms defining a space therebetween, the second end of the shaft member being received within the space and abutting the parallel arms, the movement of the adjuster member being accompanied by movement of the parallel arms and axial displacement of the second end of the shaft member.

According to another aspect of the invention, there is provided a method for orienting a magnetic tape head in a tape drive assembly adapted to receive a magnetic tape with tracks thereon, the tape drive assembly having a frame with support means, a shaft member with first and second ends, a motor for rotating the shaft, and a head carriage assembly mounted on the shaft member, the method comprising mounting the shaft member in the support means with the first end thereof pivotable about a fixed point, and the second end thereof being mounted in the support means such that it is capable of movement, said movement resulting in axial displacement of the shaft member; mounting the head carriage assembly including magnetic tape head on the shaft member whereby the head carriage assembly is moved by rotation of the shaft member in a direction parallel to the axis of the shaft member; determining the desired orientation of the tape head on the head carriage assembly such that the tape head will precisely register with tracks on the magnetic tape; adjusting the adjuster means to move the second end of the shaft member to a position such that the tape head will be in the desired position; securing the adjusting means to the support means when the tape head is in the desired position to retain the tape head in that position.

According to yet a further aspect of the invention, there is provided apparatus for precise positioning of a tape head at a track on magnetic tape adapted to be received in a drive assembly having a memory and a motor, the apparatus comprising a laser source for emitting a laser beam; a mounting tray for receiving the tape drive assembly; a reflector member for mounting on the tape head for movement therewith; means for directing the laser beam from the laser source to the reflector; means associated with the laser source for accurately measuring the distance travelled by the tape head from a predetermined point to a position adjacent a track on the magnetic tape; means for determining the extent of movement of the motor for the distance travelled by the tape head; programming means for programming the tape drive assembly memory with the extent of such movement.

The invention may further comprise a method for precise positioning of a tape head at a track on magnetic tape adapted to be received in a drive assembly having a memory and a motor, the method comprising determining a starting point and programming said point into the tape drive assembly memory; determining the number of turns or steps of the motor in moving the tape head from the starting point to the desired track; programming said number of turns into the tape drive assembly memory; determining the number of turns or steps of the motor from the starting point to the remaining tracks and programming said number of turns into the tape drive assembly memory.

BRIEF DESCRIPTION OF THE DRAWINGS

FIG. 3 is a top view of the portion of the frame shown in FIG. 2.

FIG. 4 is a detail top view of the lead screw shaft and assembly, as shown in FIG. 3.

FIG. 5 is a side view of the lead screw shaft, with various surrounding components omitted to show more clearly the structure of the shaft.

FIG. 9 is a plan view of the adjuster assembly.

FIG. 10 is a side view of the adjuster assembly viewed from arrow C in FIG. 9.

FIG. 11 is a side view of the adjuster plate viewed from arrow D in FIG. 9.

DETAILED DESCRIPTION OF THE PREFERRED EMBODIMENT

Figure 1:
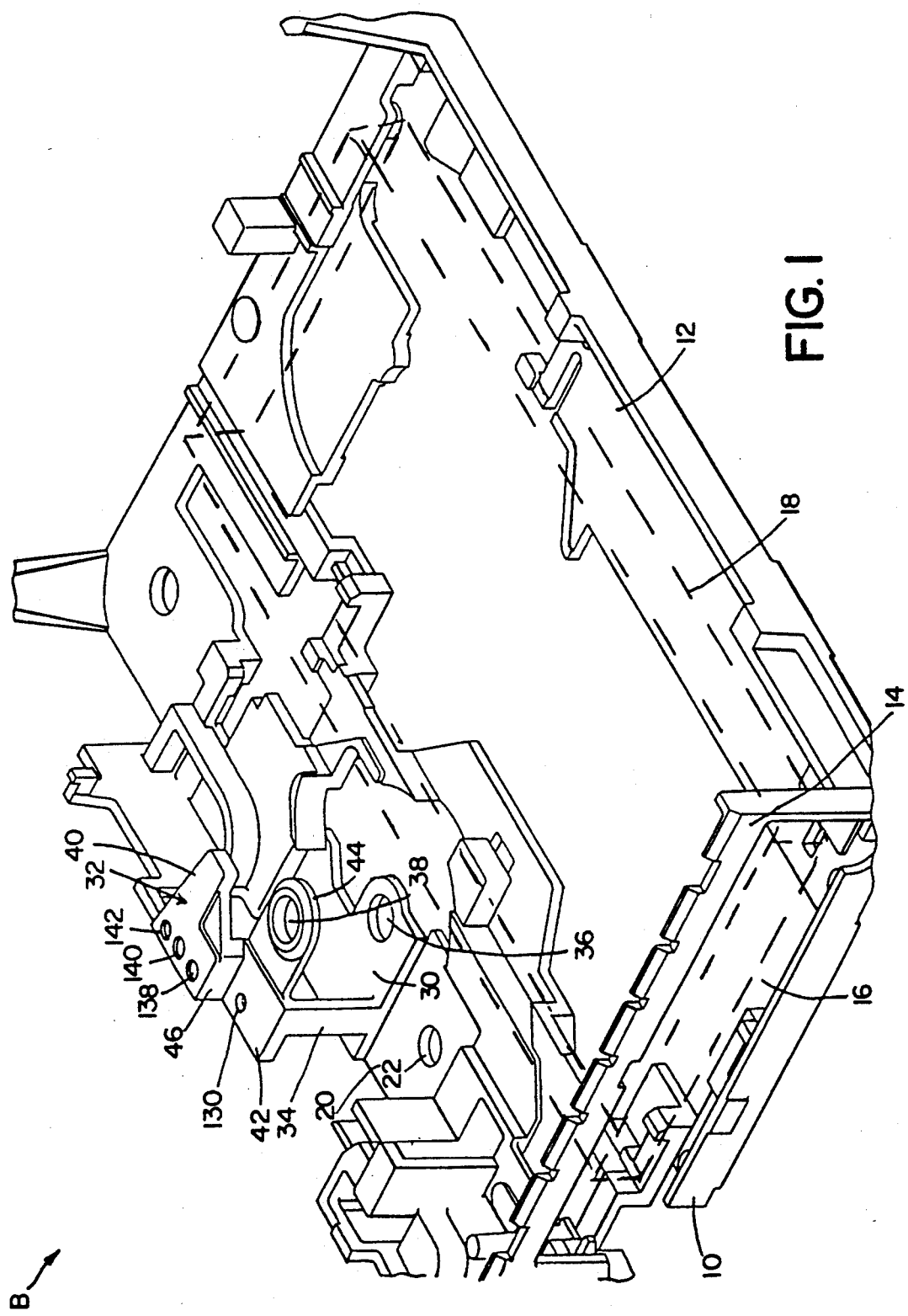
FIG. 1 is a perspective view of a tape drive frame for use with a computer, the frame being adapted to receive a magnetic tape cassette.

Reference is now made to FIG. 1 to 16 of the drawings In FIG. 1, there is shown a tape drive frame 10 adapted to be connected with, for example, a computer. The frame 10 generally comprises a base 12, and a side wall 14 at one edge of the base 12. The side wall 14 defines a slot 16 through which a magnetic tape cassette 18, indicated in staggered lines in FIG. 1, can be inserted and withdrawn. The frame 10 is equipped with various motors and elements which permit insertion and withdrawal of the tape cassette 18, none of which are shown in the present illustrations, and which are not pertinent to the present invention.

The magnetic tape cassette 18 has located therein a length of magnetic tape mounted about spindles, whereby the tape can be moved from one spindle to another in such a manner so as to present a specific portion of the magnetic tape to a magnetic tape head for reading, as will be discussed in further detail below.

Figure 16:
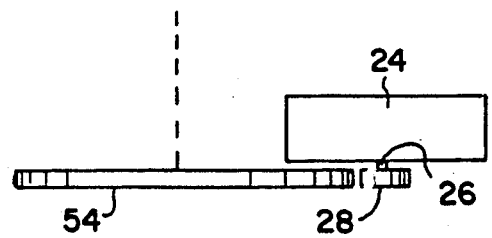
FIG. 16 is a side view of the motor and gear upon which the lead screw assembly is mounted, showing the direct drive and gear reduction.
Figure 17:
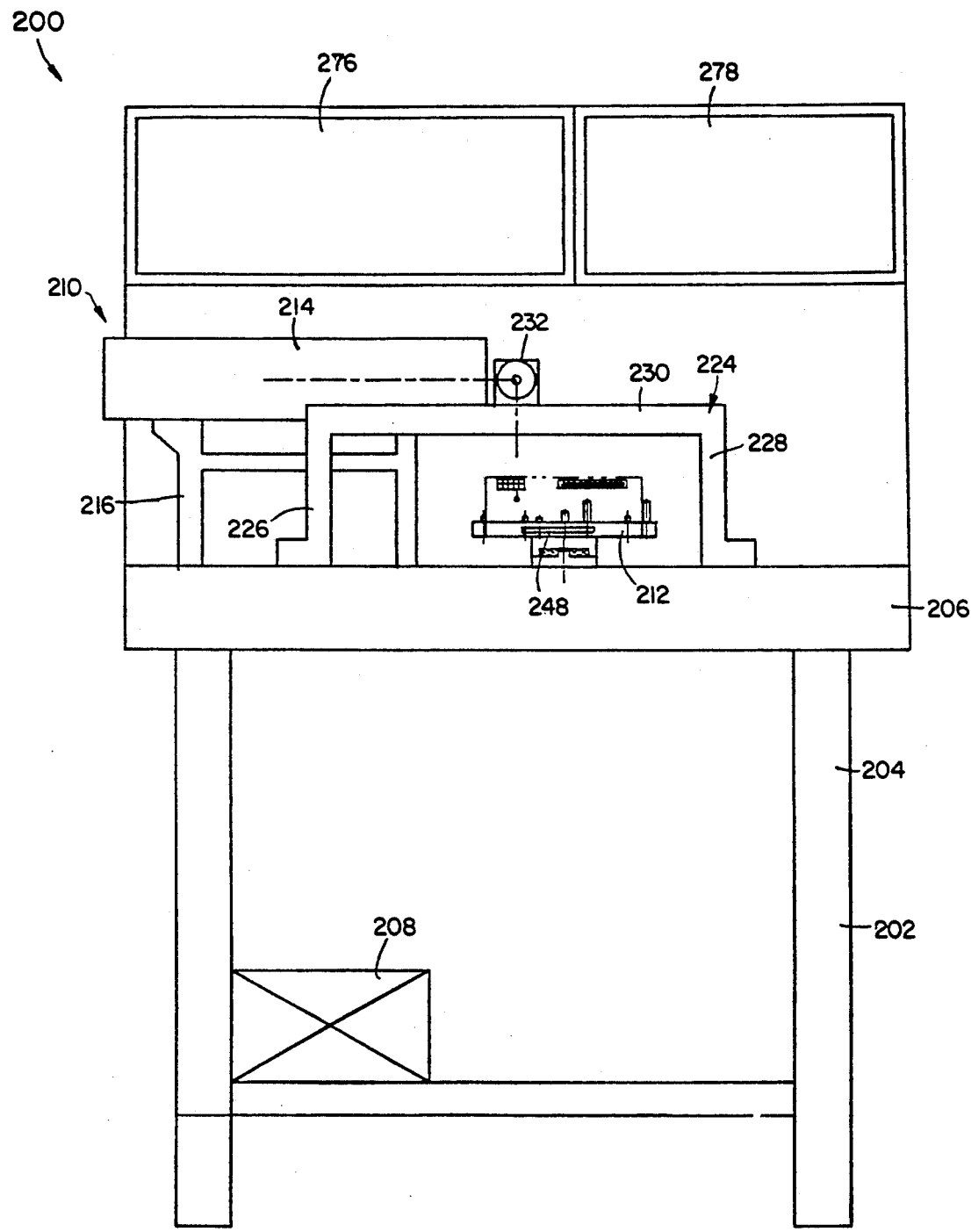
FIG. 17 is a front view of the stepper correction apparatus in accordance with another aspect of this invention.

The frame 10 comprises a motor support plate 20 having an aperture 22 therein. In use, and as described in further detail hereunder, a motor 24 is mounted on the motor support plate 20, the motor driving a shaft 26 extending through the aperture 22, and a motor gear 28 mounted at the end of the shaft 26 remote from the motor 24. This arrangement is best illustrated in FIG. 16

The frame 10 further comprises a lower plate 30 and an upper plate 32 above the lower plate 30, the lower and upper plates being adapted to support the lead screw shaft and head carriage, described fully hereunder. The lower and upper plates 30 and 32 are separated by a vertical column 34. The lower plate 30 has an aperture 36 while the upper plate 32 comprises a slot 38 coaxial with aperture 36. The upper plate 32 is comprised of an upper step portion 40, a lower step portion 42 and a cantilever shelf portion 44 extending inwardly with respect to the frame from the lower step portion 42. The slot 38 is located in the shelf portion 44. The upper step portion 40 is approximately L-shaped, and is joined to the lower step portion 42 by means of a connecting piece 46.

The upper plate 32 and lower plate 30 are positioned such that, when the lead screw shaft and head carriage are mounted between aperture 36 and slot 38, the tape head will access a portion of the tape in the magnetic tape cassette through an opening in the cassette The frame is further equipped with tape cassette driving means, not shown, for rotating the spindles and therefore moving the tape.

A lead screw shaft 48, of generally cylindrical shape, is mounted between aperture 36 and slot 38 in the lower plate portion 30 and upper plate 32. The screw shaft 48 has threads 50 along substantially its entire length. The screw shaft 48 has a mounting shaft 52 at its lower end which extends through the aperture 36 and is connected to gear 54, shown in, for example, FIGS. 2, 5 and 16. The gear 54 is adapted to engage the motor gear 28 such that the motor, when activated, rotates the screw shaft 48 through shaft 26, motor gear 28, gear 54 and mounting shaft 52. It is to be noted that the gear ratio between the relatively small motor gear 28 and relatively large gear 54 substantially enhances the resolution per step in the movement of the head carriage assembly when mounted on the lead screw shaft 48 as described hereunder.

At the base of the screw shaft 48, there is located a disk shaped flange 56 which rotates with the screw shaft 48. At one point on its circumference, the flange 56 comprises a projection 58, which rotates with the flange 56. The projection 58 is adapted to engage with the head carriage when the head carriage is at its lowermost point with respect to the screw shaft 48, thereby preventing further rotation of the screw shaft 48. This feature will be described in further detail below.

The upper end of the screw shaft 48 comprises a protruding portion 60 of generally disk shape, and coaxial with the central axis of the screw shaft. The protruding portion 60 and screw shaft 48 define a step, the horizontal component 62 of which step is generally flush with or below the level of the lower surface of cantilever shelf portion 44. The protruding portion 60 is above the level of the lower surface of shelf portion 44, extending into the slot 38.

A ring 64 (best seen in FIG. 8) is inserted into the slot 38 from the upper end thereof. The ring 64 comprises a hollow cylindrical portion 66, and a flange 68 at the upper end of the cylindrical portion. The outer diameter of the flange 68 is slightly greater than the width of the slot 38 thereby preventing the ring 64 from passing through the slot 38. The outer diameter of the hollow cylindrical portion 66 is slightly less than the width of the slot 38, thus permitting a small amount of movement or sliding of the ring 64 inside the slot 38. The ring 64 is inserted in the slot 38 such that the flange 68 rests on the upper surface of the shelf portion 44, the screw shaft 48 with protruding portion 60 being located in the hollow space of the cylindrical portion 66. The protruding portion 60 is secured to the ring 64 by means of a washer and U-shaped clamp 70, best illustrated in FIGS. 3 and 4. From the above description, it will be appreciated that the lead screw shaft 48 is firmly mounted for rotation between lower plate 30 and upper plate 32. At its lower end, the screw shaft 48 is fixed to the gear 54 and cannot be axially displaced therefrom, although pivoting of the shaft about such point is possible. At its upper end, the screw shaft 48 is secured to the ring 64, which is mounted in the slot 38. Since the cylindrical portion 66 of ring 64 is of slightly smaller diameter than the width and the length of the slot 38, some movement of the ring 64 in the slot 38 is tolerated, and movement of the ring 64 results in concomitant movement of the screw shaft 48. Thus, movement of the ring 64 in the slot 38 results in some displacement of the screw shaft 48, and the axis of the screw shaft 48 may be angled relative to the vertical longitudinal axis thereof.

A head carriage assembly 72 is mounted on the lead screw shaft 48. The head carriage assembly, best illustrated in FIGS. 2, 6 and 7, comprises a tape head 74 and a tape head support 76. The tape head support 76 comprises a central post 78 having an aperture 80 therein, the aperture 80 having an internal thread which mates with the threaded outer surface of the lead screw shaft 48. The tape head support 76 further comprises an outwardly extending arm 82 approximately tangential to the aperture 80. Connected to the outwardly extending arm 82 is an S-shaped pivot arm 84 having a first portion 86 which connects to the outwardly extending arm 82, a transverse portion 88 and a second portion 90. The second portion 90 has a notched groove 92 along one side thereof, adapted to accommodate a pin 94 which is mounted to the frame 10. An anti-rotation spring 96 extends from the second portion 90 to the central post 78. The spring 96 acts on a half nut which is thereby pushed against the screw shaft 48.

The effect of the pin 94 on the pivot arm 84, and the spring 96 and half nut, is that the tape head support 76 is prevented from rotating about the axis of the lead screw shaft 48 when the latter is caused to rotate by the motor 24. Since the tape head support 76 is prevented from rotational movement, rotation of the screw shaft 48 thereby causes the tape head support 76 to be raised or lowered, according to the direction of rotation of the screw shaft.

Figure 7:
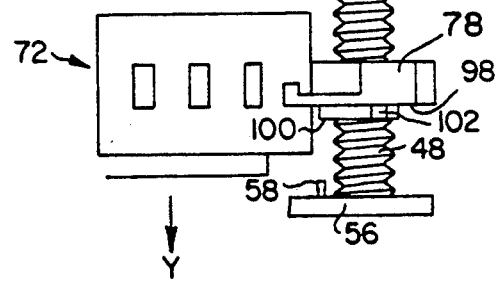
FIG. 7 is a side view of the head carriage assembly shown mounted on the lead screw shaft.
Figure 8:
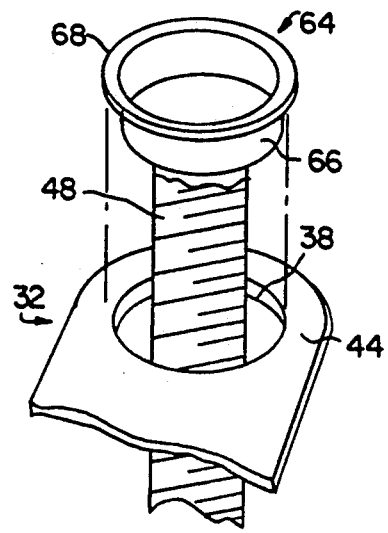
FIG. 8 is an exploded perspective detail view showing the upper end of the lead screw shaft and ring mounted to the frame.
Figure 12:
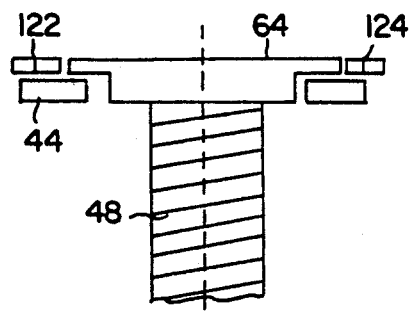
FIG. 12 is a detailed side view showing the upper portion of the lead screw shaft in a first position with respect to the frame.
Figure 13:
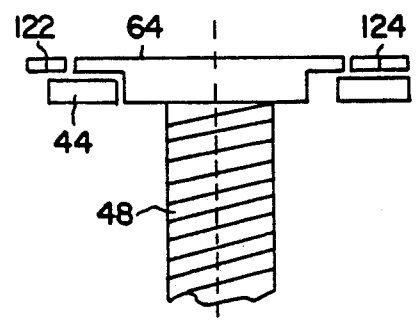
FIG. 13 is a detailed side view showing the upper portion of the lead screw shaft in a second position with respect to the frame.

The undersurface 98 of the central post 78 has a disk-like flange 100, best illustrated in FIG. 7. The flange 100 has a projection 102, designed to engage with the projection 58 of the flange 56 at the base of the screw shaft 48. With reference to FIG. 7, it is to be noted that rotation of the screw shaft 48 either causes the head carriage assembly 72 to be raised in the direction of arrow X, or to be lowered in the direction of arrow Y. When the central post 78 approaches the flange 56, projection 102 is also lowered, until it reaches a point where it engages the rotating projection 58 on the flange 56. Engagement of the projections 58 and 102 prevents further rotation of the screw shaft 48, and thus further lowering of the head carriage assembly 72.

Extending from the central post 78 are two mounting arms 104 and 106. The mounting arms 104 and 106 support the tape head 74. The tape head 74 has a tape contact surface 108 on one side thereof, and a series of leads 110 away from the head for carrying signals to and from the tape head 74.

As described fully above, the head carriage assembly 72 is mounted, by means of its central post 78, about the lead screw shaft 48 for upward and downward movement on the shaft 48. It will be appreciated that, over and above any rotational movement of the lead screw shaft resulting in upward and downward movement, other movement, realignment or reorientation of the lead screw shaft will have a corresponding effect on the movement of the head carriage assembly 72, and particularly the tape contact surface 108. As fully described above, the lead screw shaft 48 is mounted with respect to the frame so that the central axis of the lead screw shaft 48 is capable of angular displacement relative to the axis of the aperture 36 and slot 38. Thus, axial dislocation of the lead screw shaft 48 will have a corresponding effect on the tape contact surface 108, which can be angularly displaced or reoriented by appropriate adjustment of the lead screw shaft 48 in its mounting in the frame 10 The importance of this capability to finely adjust the position of the tape contact surface 108 is manifest, since a more precise or accurate contact can thereafter be made between the tape contact surface 108 and the tape in the magnetic tape cassette Further description of this adjustment, and its importance, is set out below.

At this point, the position of the motor 24 relative to the lead screw shaft 48 is highlighted. In the embodiment described, the motor 24 is mounted on the frame laterally adjacent the lead screw shaft 48, as opposed to immediately below it. Two advantages result from this configuration. The first advantage is that the frame can be considerably thinner than if the motor were located below the lead screw shaft 48, a configuration which is common in existing tape drives. By locating the motor laterally adjacent the lead screw shaft, the additional thickness required thereby in the frame can be avoided, which results in a more space efficient and compact tape drive assembly. Since considerations of space and compactness are important in the ongoing efforts to reduce the size of components which comprise a computer, this structure is an important advantage. A second advantage of the system is that a gear ratio between the motor gear 28 and gear 54 can be achieved which results in increased resolution per step and thus accuracy and precision in the disposition of the tape head 74 which respect to the magnetic tape. Since the motor gear 28 is, relatively speaking, very small in comparison to the gear 54, small unintended movements caused by the motor to the motor gear 28 will have very little effect on the position of the tape head 74. In tracking the magnetic tape by locating the tape head 74 with respect thereto, a process to be described more fully hereunder, the tape head 74 must be accurately positioned, and this is achieved by programmed instructions to the motor for a predetermined number of turns or steps in order to reach that position. If the motor slightly exceeds or falls slightly short of the precise number of turns, the difference in the number of turns will not significantly effect the final position of the tape head 74 in the embodiment herein described. For example, an additional half turn of the motor gear 28 will result in the gear 54 being rotated only fractionally, and the position of the gear carriage assembly 72 will be displaced, if at all, only a minute distance which would not significantly effect the position of the tape head 74.

Reference is now made to FIGS. 9, 10 and 11, which illustrate the adjuster assembly used for adjusting the angular axial orientation of the lead screw shaft 48 to the desired position. The adjuster assembly 112 comprises a securing portion 114 and an adjuster portion 116, the securing portion 114 being raised with respect to the adjuster portion 116 and separated therefrom by a vertical wall 118. The securing portion 114 is generally located on the upper step portion 40 of the frame 10, while the adjuster portion 116 is located over the lower step portion 42 and cantilever shelf portion 44. The vertical wall 118 lies generally adjacent the connector piece 46 between the upper step portion 40 and the lower step portion 42.

The adjuster portion 116 comprises a flat plate 120 with a pair of fingerlike projections 122 and 124 extending therefrom. The fingerlike projections 122 and 124 define a rectangular space 126. The space 126 defined between the finger projections 122 and 124 has a distance which is substantially identical to the outer diameter of flange 68 of ring 64. The flat plate 120 has a fulcrum projection 128 on the underside thereof, which is received in aperture 130 located in the lower step portion 42 of upper plate 32. The fulcrum projection 128 has a diameter which is substantially identical to the diameter of aperture 130; thereby permitting some pivotable movement of the adjuster assembly 112 about the axis of aperture 130, but there is no "play" or lateral movement permitted by the fulcrum projection 128 in the aperture 130.

The securing portion 114 has three substantially equispaced holes 132, 134 and 136 therethrough. In the frame 10, the upper step portion 40 has three substantially corresponding holes. The hole 138 corresponds with hole 132, hole 140 corresponds with hole 134, and hole 142 corresponds with hole 136. The holes 138 and 140 on the upper step portion have an internal thread. The holes 138 and 140 register with holes 132 and 134, and are of slightly larger diameter than the holes 132 and 134. The hole 136 in the securing portion 114 is of slightly greater diameter than the hole 142 on the upper step portion, and the holes 136 and 142 are slightly axially misaligned and therefore eccentric with respect to each other, for purposes to be discussed fully hereunder.

A screw 144 extends through the hole 132 and threadedly engages hole 138, in order to secure the adjuster assembly 112 to the upper plate 32. A further screw 146 extends through hole 134 and threadedly engages hole 140 for the same purpose. Since the diameters of holes 132 and 134 are slightly greater than the diameters of holes 138 and 140, the adjuster assembly 12 may be secured to the upper plate 32 over a small but varying range of positions, since tolerance for adjustment is provided.

In use, the adjuster assembly 112 is located over the upper plate 32, as described above. The fingerlike projections 122 and 124 straddle the ring 64, such that the outer diameter of the flange 68 thereof abuts, or is in contact with, the inside edges of fingerlike projections 122 and 124. The fulcrum projection 128 is received inside aperture 130 and is pivotable therein. Hole 138 registers with hole 132 and screw 144 is inserted to secure the adjuster assembly 112 to the upper plate 32. The hole 134 registers with hole 140, and screw 146 is also used for securing purposes. Hole 136 partially registers with hole 142, both holes remaining open with no bolt, screw or other securing means passing therethrough.

Figure 2:
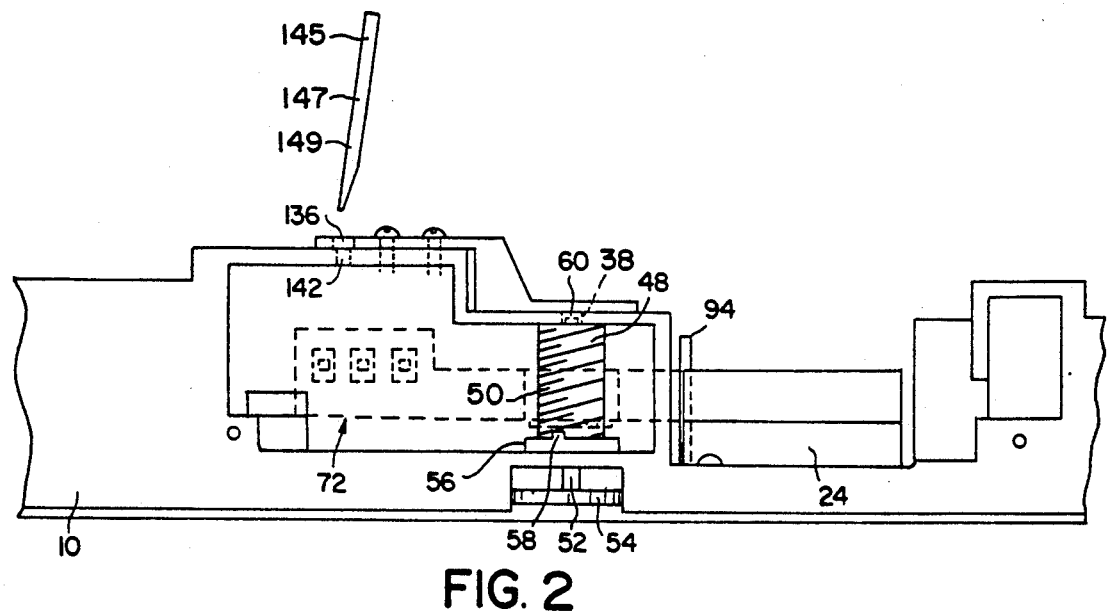
FIG. 2 is a partial side view of the frame shown in FIG. 1 viewed from the direction of arrow B, the frame having been fitted with various components.
Figure 2A:
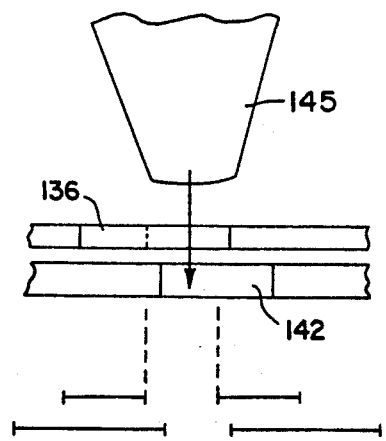
FIG. 2(a) is an enlarged diagrammatic view showing adjustment of the tape drive frame.
Figure 6:
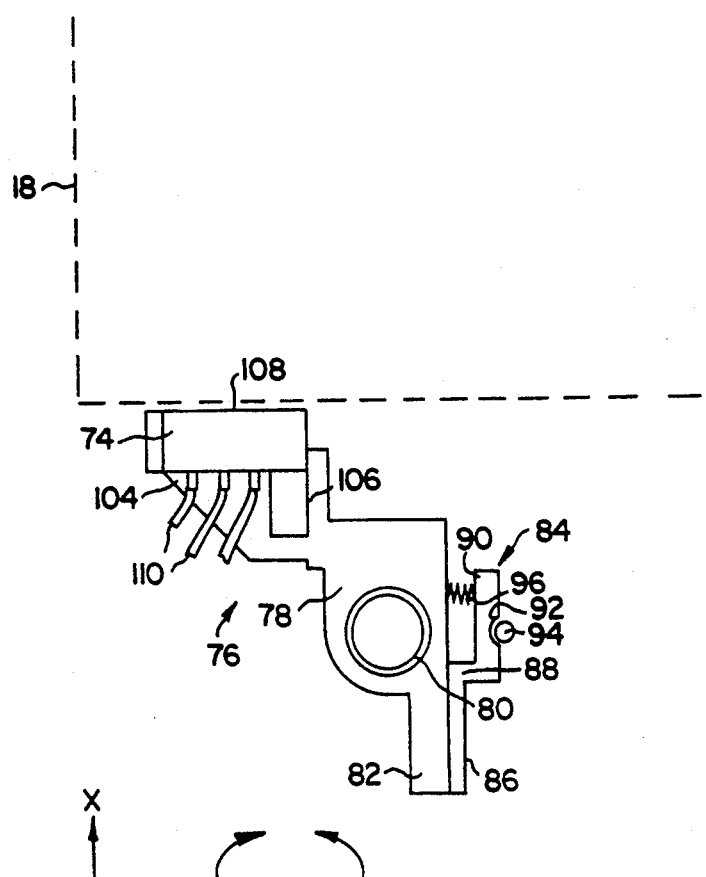
FIG. 6 is a plan view of the head carriage assembly, shown mounted on the lead screw shaft.

An adjuster tool 145, shown in FIGS. 2 and 2(a) is provided. The adjuster tool 145 comprises a substantially cylindrical elongated portion 147 and a tapering portion 149. The diameter of the tapering portion 149 at its smallest cross-section is less than the diameter of the hole 142. The diameter of the tapering portion 149 at its point of greatest cross-section exceeds the diameter of the hole 142.

Figure 14:
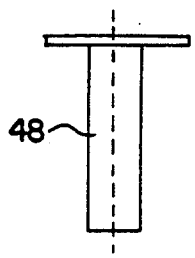
FIGS. 14 and 15 show diagrammatic representations of the lead screw assembly in an exaggerated tilt to illustrate the first and second positions thereof when moved by the adjuster assembly.
Figure 15:
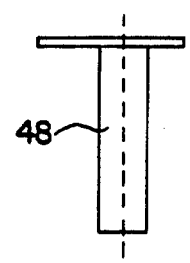

With the screws 144 and 146 in a snug condition, the position of the adjuster assembly 112 can be varied by inserting the adjuster tool 145 into the holes 136 and 142. When the tool 145 abuts against the edges defining hole 142 and/or hole 136, further downward movement through the hole 142 is no longer possible Thereafter, the tool 145 can be pivoted about the point at which it is fixed, and such movement will cause the tapering portion 149 of the tool 145 to engage the sidewalls defining the hole 136 and/or hole 142. The effect of this movement can best be seen with respect to FIGS. 2, 2(a) and 9. A sufficient force on the tool 145 against the walls defining holes 136 and/or 142 will cause the adjuster assembly 112 to move, such movement comprising pivoting about the fulcrum projection 128. Movement of the adjuster assembly 112 about fulcrum projection 128 causes corresponding movement of the fingerlike projections 122 and 124, which movement is in turn transferred to the ring 64. The slight movement of the ring 64 adjusts the position of the upper end of the lead screw shaft 48 which, as described above, is pivotable about its lower end, for example, the mounting shaft 52. Extent of movement of the lead screw shaft 48 can be seen in FIGS. 12 and 13, while exaggerated tilt of the screw as a result of such movement is illustrated in FIGS. 14 and 15. The head carriage assembly 72, mounted to the lead screw shaft 48 as detailed above, will undergo an adjustment of its position in response to the movement of the adjuster tool 145. When the tape head 74 is in precisely the desired position, the clamping screws 144 and 146 are tightened to securely hold the adjuster assembly 112 to the frame, and to retain the lead screw shaft 48 and head carriage assembly 72 in the desired fixed position.

Under normal circumstances, the adjuster assembly 112 will be set at the factory prior to installation of the tape drive into the computer, and under normal circumstances, no further adjustment will be necessary. However, if misalignment between the tape head 74 and the magnetic tape should arise due to a slow movement or settling over time, or a sudden shock movement, resetting of the precise position of the head carriage assembly 72 can be made using the techniques described above.

The above device therefore provides a frame for a tape drive, the thickness of which can be substantially reduced as a result of location of the motor laterally adjacent the lead screw shaft as opposed to below such shaft. In existing devices, reduction in the thickness of the frame is usually accompanied by a reduction in the precision in critical alignment which can be set between the tape head and the tape tracks. Thus, as the frame is made thinner and the components smaller, accuracy may be sacrificed and tracking becomes more difficult.

The present device attempts to overcome this disadvantage by placing the motor laterally adjacent the lead screw shaft, providing a very favorable and efficient gear ratio, and a direct drive from the motor to the lead screw shaft. The effect of the favorable gear ratio and direct drive system permits for greater accuracy in setting the motor and head carriage assembly for accurate and precise tracking of the magnetic tape.

Referring to FIGS. 17 to 21 of the drawings, there is shown a stepper correction apparatus 200. The stepper correction apparatus 200 comprises a vibration isolation table 202 having a support frame 204, upon which is mounted a granite base 206. The support frame 204 carries a power supply 208 Mounted on the granite base 206 is a laser interferometer identified generally by the numeral 210, and a sliding fixture 212. The sliding fixture 212 is designed to receive a tape drive frame 10 as shown in FIG. 1. The frame 10 to be located in the sliding fixture 212 is one which has been fitted with a lead screw shaft, head carriage assembly, necessary motors and drives for receiving, driving and reading a magnetic tape located in a tape cassette.

Mounted on the granite base 206 is a laser interferometer tube 214 containing the laser source, and from which the laser beam is emitted. The interferometer tube 214 is mounted on a stand 216, and is thus raised above the level of the surface of the granite base 206. Adjacent the end 218 of the interferometer tube 214 where the beam is emitted, there is located a prism 220 mounted on a pedestal 222. The prism 220 is arranged so as to deflect the laser beam through an angle of 90°. A bracket 224 comprising two vertical arms 226 and 228 and a horizontal arm 230 is mounted on the base 206, such that the horizontal arm 230 is located over the sliding fixture 212, with the vertical arms 226 and 228 on either side of the sliding fixture 212 respectively. Mounted on the horizontal arm 230 of the bracket 224 is a beam bender 232. The laser beam emerging from the interferometer tube 214 is deflected by the prism 220 and directed to the beam bender 232, which in turn deflects the laser beam in a downward direction towards the sliding fixture 212 to a position to be discussed more fully below.

Figure 18:
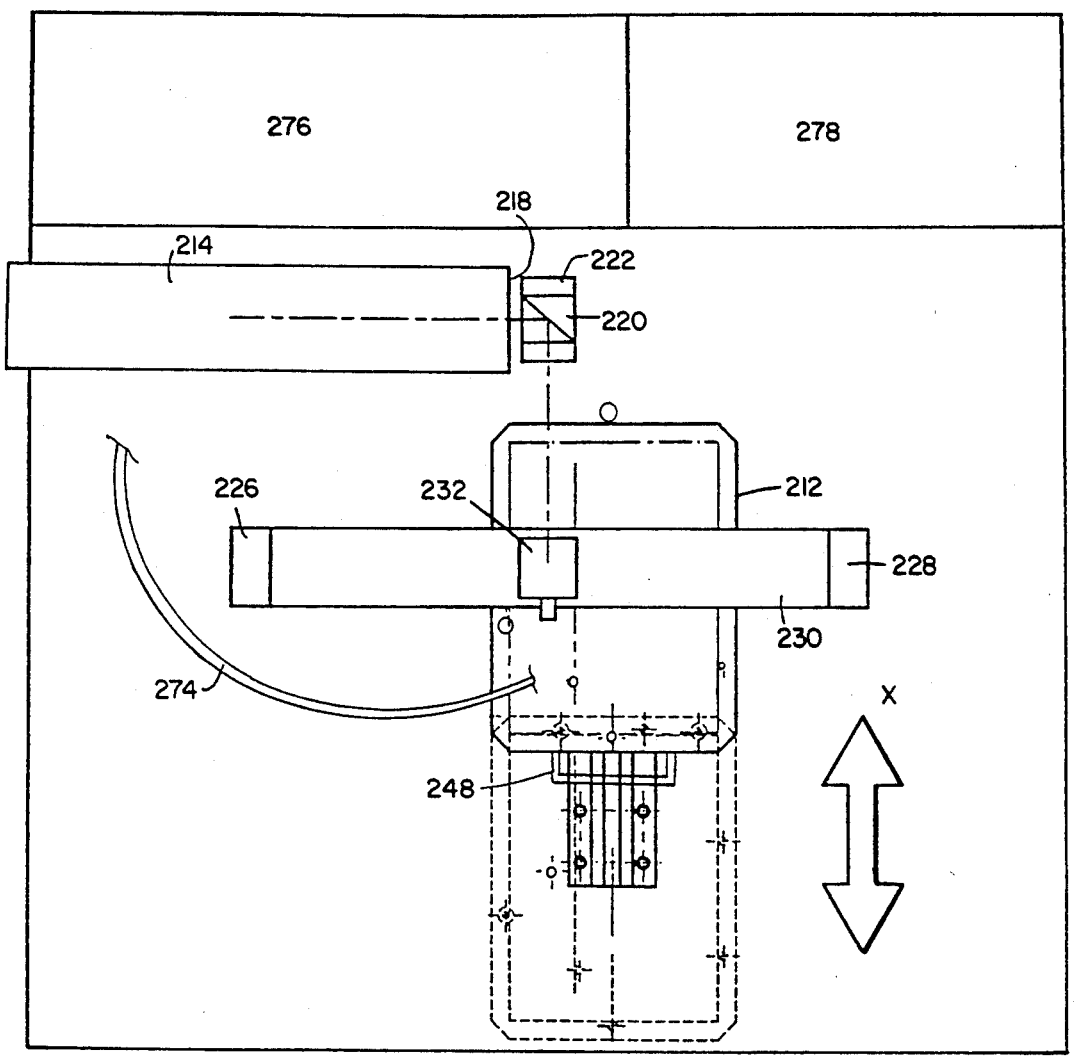
FIG. 18 is a plan view of the stepper correction apparatus shown in FIG. 17.
Figure 19:
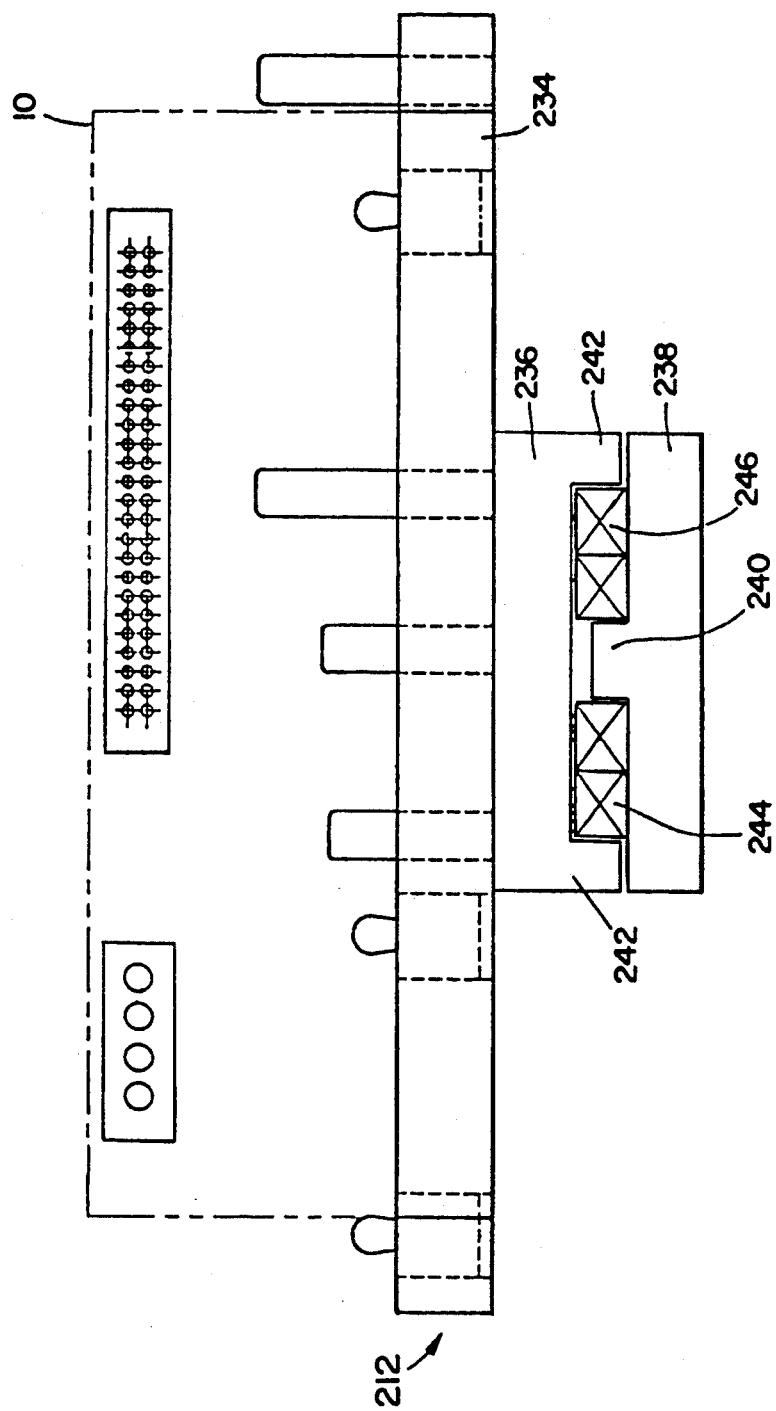
FIG. 19 is a detailed side view of the sliding fixture which forms part of the stepper correction apparatus.

The sliding fixture 212, best seen in FIG. 19, comprises a horizontal tray 234 to which is fixed a U-shaped base bracket 236. The base bracket 236 cooperates with a rail guide 238 which is fixed to the granite base 206, the rail guide 238 having a centrally located ridge 240. The arms 242 of the U-shape bracket 236 are mounted over the rail guide 238, and, with the ridge 240, define a pair of spaces, each containing a track 244 and 246. In use, the bracket 236, which is fixedly connected to horizontal tray 234, slides backwards and forwards with respect to the rail guide 238 over the track members 244 and 246. The backward and forward movement, represented by arrow X, can best be appreciated by viewing FIG. 18. The sliding fixture 212 is shown in solid lines in the first forward or withdrawn position, and in staggered lines in the second rearward or extended position. A handle 248 is provided along the rear edge of the tray 234 to permit manual movement of the tray 234 backward and forward over the rail guides 238.

Locking means are provided to lock the tray 234 against movement when in the forward or withdrawn position shown by solid lines in FIG. 18, and at the rearward or extended position, shown by staggered lines in the same FIGURE.

A tape drive frame 10 can be removably inserted and withdrawn from the horizontal tray 234. The horizontal tray includes four spring location pins, designated with the reference numeral 250, press-fit dowel pins, having reference numeral 252, all of the pins 250 and 252 being located on the tray so as to firmly hold in position the tape drive 10.

Figure 20:
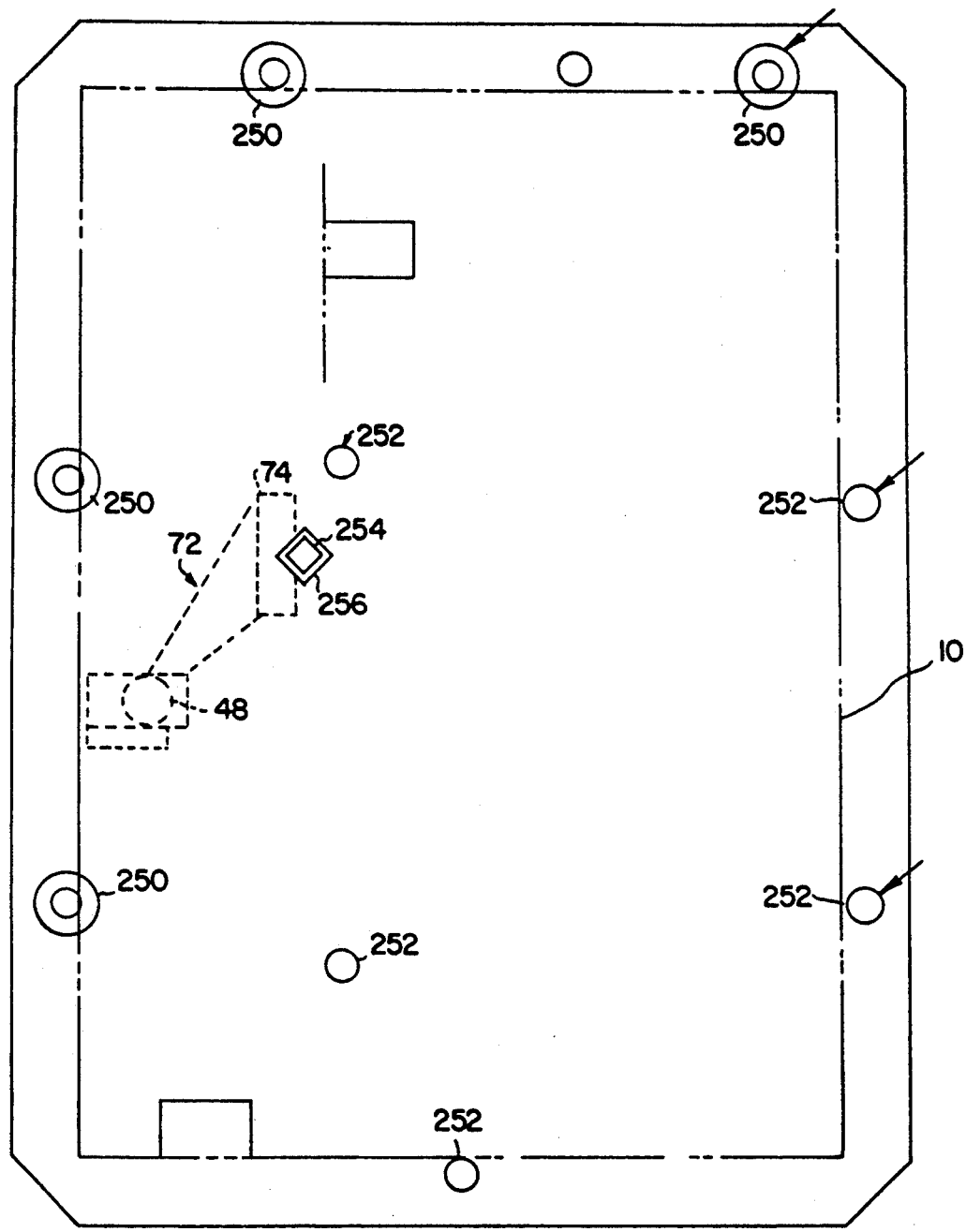
FIG. 20 is a plan view of the sliding fixture which forms part of the stepper correction apparatus, further showing in outline the position of the tape drive.

It is to be noted that the tape drive 10 shown in FIG. 20 of the drawings has incorporated therein the lead screw shaft 48 and the head carriage assembly 72. A retroreflector 254 is mounted on the tape head 74 through a mounting bracket assembly 256.

Figure 21:
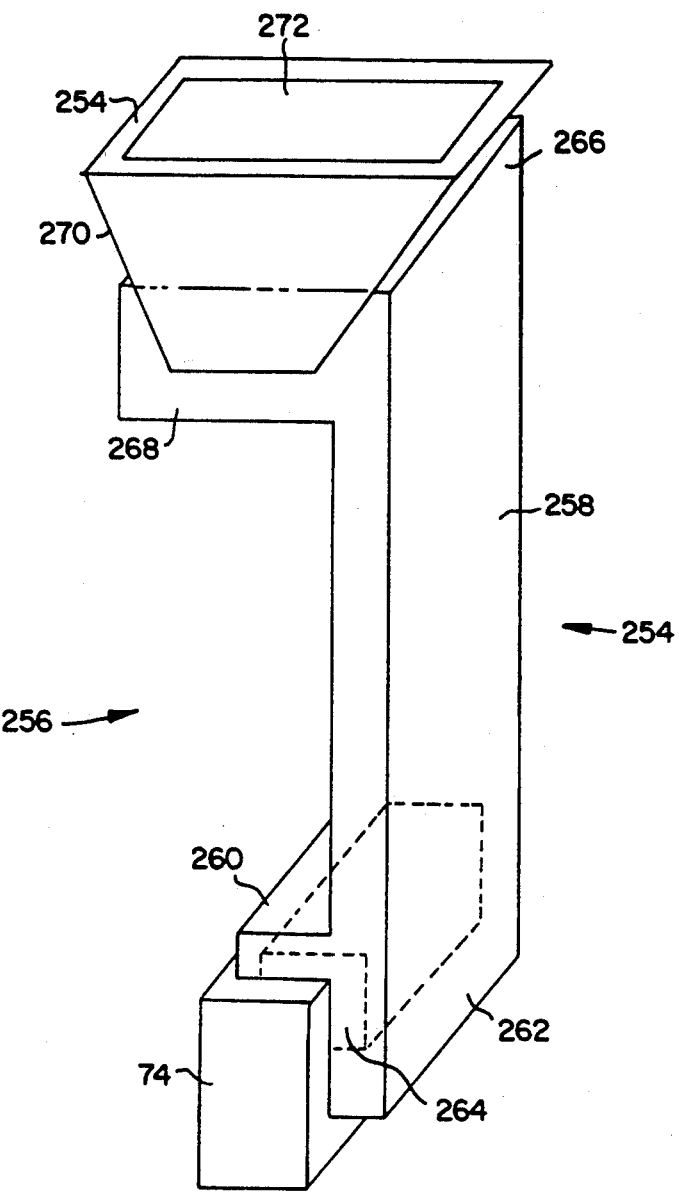
FIG. 21 is a perspective view of a retroflector forming part of the stepper correction apparatus.

The mounting bracket assembly 256 and retroreflector 254 are best illustrated in FIG. 21 of the drawings. The mounting bracket assembly 256 is adapted to releasably attach to the tape head 74, and comprises a vertical wall 258 and a horizontal flange 260. The horizontal flange 260 and lower end 262 of the vertical wall 258 define an inverted L-shaped structure which permits the mounting bracket assembly 256 to be easily located over the tape head 74. The horizontal flange 260 and lower end 262 have incorporated therein a magnet 264 which insures that the bracket assembly 256 remains secured to the tape head 74 without over-balancing, but facilitates easy removal of the bracket 256 from the tape head 74 with the application of a small force.

At the upper end 266 of the vertical wall 258, there is provided a horizontal shelf 268, which supports the retroreflector 254. The reflector 254 comprises a support dish 270, which is fixedly mounted to the horizontal shelf 268, and a light beam reflector 272. The light beam reflector 272 is of a V-shape, and is designed to reflect the beam emitted from the laser interferometer back to this device for measurement.

The stepper correction apparatus 200 includes appropriate wiring connection 274, for connecting to a motor 24 in a tape drive 10, and further wiring to transmit signals to the memory and programming devices within the tape drive (not shown), the signals comprising information to be stored in the tape drive with respect to accurate tracking by the tape head 74.

In operation, the stepper correction apparatus 200 is used for accurately programming for tracking purposes the tape head 74 of a tape drive 10. A tape drive frame 10 is placed on the horizontal tray 234 and held firmly in the correct position by spring location pins 250 and dowel pins 252. The tape drive 10 is placed within the horizontal tray 234 when in the extended or rearward position, as shown in the staggered lines in FIG. 18 of the drawings. With the tape drive 10 firmly in position ,in the orientation indicated on the horizontal tray 234, a reflector 254 is placed on the tape head 74 as described with reference to FIG. 21. Using the handle 248, or any other suitable automated means, the horizontal tray 234 is thereafter moved over the rail guide 238 and track 244 and 246 until it reaches its fully withdrawn position shown by the solid lines of the tray in FIG. 18 of the drawings. In its fully withdrawn position, locking means are provided which engage preventing further sliding of the horizontal tray 234 in the normal course. Only the application of a significant force would be sufficient to disengage the locking means and allow movement of the horizontal tray into the extended position. Prior to moving the horizontal tray 234 and tape drive 10 into the withdrawn position, the wiring connection 274 is connected to the tape drive 10, providing a source of power for the motor 24, and means for transmitting signals for programming the motor, memory and other features of the tape drive 10 in the manner desired The wiring connections 274 are coupled to a stepper controller 276 and a laser controller 278, which in turn are coupled with the laser interferometer so that accurate measurements taken by the interferometer can be processed by the laser controller 278 and stepper controller 276 to provide pertinent program signals to the tape drive 10.

When the horizontal tray 234 is locked in the withdrawn position, the beam emitted from the interferometer tube 214 will be deflected by the prism 220 to the beam bender 232, and the beam bender 232 will in turn deflect the beam downwardly to the light beam reflector 272 of retroreflector 254. The light beam reflector 272 will reflect the beam to the interferometer tube and, in conventional methods of measurement using laser beams, fine or very small changes in distance will be measured. As described above with respect to FIGS. 1 to 16, the tape head 74 is adapted for up and down displacement as a result of rotation of the lead screw shaft 48 in response to activation ot the motor 24. The retroreflector 254, mounted on the tape head 74, will, therefore, also move up and down with the displacement of the tape head 74. The system is designed to measure linear distance, namely, up and down distance, moved by the tape head, to monitor and detect fluctuations in position, and to control position settings. The very high accuracy of the laser interferometer has the ability to measure such linear distance to within approximately three one millionths of an inch, and very accurate setting of the tape head 74 for the purposes of tracking is therefore possible.

The head carriage assembly 72 is driven by a stepper motor, lead screw shaft, through an appropriate gear train. Almost all of the mechanical components comprising this system, including the lead screw, stepper motors, shafts, gears and bearing systems, have tolerances. As a result of these tolerances, errors can, and do, easily occur in programming and directions for the tape head 74 to reach a particular track on the magnetic tape. Where the magnetic tape has only a low number of tracks thereon, precision tracking is less important than when a large number of tracks are present, as is usual with respect to most of the magnetic tapes currently on the market. Therefore, small errors may become significant, and correction thereof by compensating for these errors is necessary for the continued accuracy of the tracking procedure.

The positions of tracks on magnetic tape are fairly standard, and are usually identified by being a particular distance from the lower edge of the magnetic tape. Thus, in order to move the head carriage assembly 72 with the tape head 74 from the lower edge of the tape to a particular track, the motor would normally be programmed to proceed through a certain number of steps, after which the tape head 72 would be presumed to register with the desired track. However, as a result of the tolerances as mentioned above, the standard number of steps required to reach a particular track may not in fact result in the tape head 74 actually being in the correct position. The tolerances of the motor and apparatus usually result in some inaccuracy, so that the tape head 74 is positioned slightly above or below the actual position of the track. The position to which the tape head 74 should actually travel to accurately align with a particular track is known as the nominal distance, and may be defined by the number of steps through which the motor must move to reach such position. The distance to be traveled by the tape head to reach the track in its true position is called the actual distance. Therefore, the error due to tolerances may be defined as the difference between the actual and nominal distances. The stepper correction apparatus of the present invention is designed for the purposes of programming the tape drive to insure that the tape head moves the actual distance to a particular track as opposed to the nominal distance, which may be inaccurate.

Taking into account the above explanation, the following example is provided.

EXAMPLE

The laser interferometer system described above may be used to create information, as set out in Table I below.

TABLE NO. I

| LOCA-TION NO. | DISTANCE (D) | NOMINAL NO. OF STEPS TO REACH D | ACTUAL NO. OF STEPS TO REACH D | ERROR |
|---|---|---|---|---|
| 1 | .00375 | 30 | 28 | 2 |
| 2 | (2) × (.00375) | 30 | 34 | −4 |
| 3 | (3) × (.00375) | 30 | 32 | −2 |
| 4 | (4) × (.00375) | 30 | 29 | 1 |
| 65 | | 30 | 31 | −1 |

As evidenced in the Table No. I, there would be a fixed number of locations, for example 65, representing tracks on the magnetic tape. Each location is equi-distant from the others, being equi-spaced therefrom by a distance of, for example, 0.00375 inches. The nominal number of steps, or movements of the motor, to move the head through this distance is, for example, 30. The nominal number of steps represents the number of steps which must be moved by the motor which, if the system was a perfect one, would move through the distance required However, this fails to take into account the various tolerances of the system. Therefore, as a result of such tolerances, the actual number of steps to cover the distance of say 0.00375 inches would be different from the nominal number of steps, which is 30. This difference is to be considered the "error" Error may be defined as follows:

Error=(nominal no. of steps)−(actual#of steps).

With reference to Table No. I, it is to be noted that the distance to be travelled to location number 1 is 0.00375 inches, the distance to be travelled to location number 2 is (2)×0.00375, the distance to be travelled to location number 3 is (3)×0.00375, etc. In each case, the nominal number of steps to reach a particular location is 30. Thus, the nominal number of steps to reach location number 1 is 30, the nominal number of steps between location 1 and location 2 is 30, the nominal number of steps between locations 2 and 3 is 30, etc. With reference to location number 1, the actual number of steps to cover the distance 0.00375 may be 28. The error is therefore the nominal number of steps less the actual number of steps, which is 2. With respect to each location, the actual number of steps to reach such location is determined and the error noted. The actual number of steps to reach a particular location is programmed into the system so that when the tape head is to read or write from a particular location on the magnetic tape, the precise actual number of steps to reach such a location is defined, and the motor will be programmed to go through such number of steps whereby accurate alignment is achieved.

Figure 22:
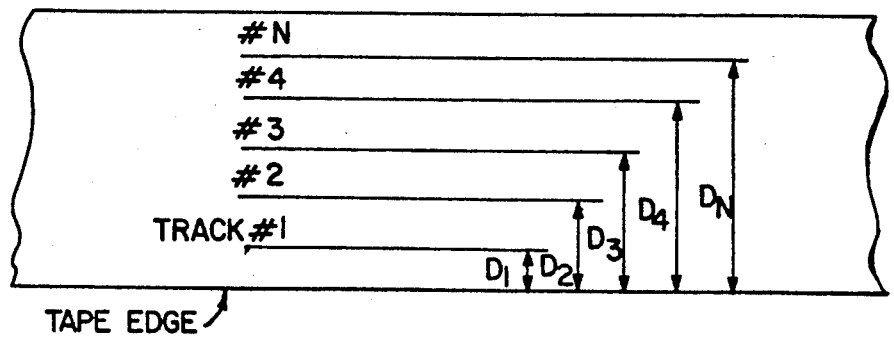
FIG. 22 is a view of a length of tape showing track location and distances.

With reference to Table No. II, there is shown a representation of the location of tracks with respect to the edge of a magnetic tape. The location of any particular track from the edge of a tape is standard in the industry, for example, a quarter inch tape for a given capacity drive has track locations a industry standard positions. Since the distance of any particular track from the edge of the tape and any other track are known, this distance can be mathematically converted to the number of steps required by the motor in order to raise or lower the tape head so as to accurately overlie a track. Table No. II above may be read in conjunction with FIG. 22, which shows a length of tape wherein the track location and distance thereof from the edge of the tape is shown. Thus, track number one is a distance $D_1$ from the edge of the tape, track number 2 is a distance $D_2$ from the edge of the tape, etc.

TABLE NO. II

| TRACK NO. | DISTANCE FROM EDGE EDGE OF THE TAPE | NO. OF STEPS FROM THE EDGE OF THE TAPE |
|---|---|---|
| 1 | $D_1$ | $N_1$ |
| 2 | $D_2$ | $N_2$ |
| 3 | $D_3$ | $N_3$ |
| 4 | $D_4$ | $N_4$ |
| etc. | | |
| etc. | | |

From the above, it will be noted that Table No. 1 will be unique to a particular drive 10, while Table II will be common to all drives.

When the location and number of steps to reach a track are to be programmed, the edge of the tape is first located with respect to the lowest point of the carriage drive assembly on the lead screw shaft 48, as described above. This is where the projections 102 and 58 engage each other. Thus, the number of steps are known from the edge of the tape to the stop point. With the information contained in Table No. II, track locations are known with respect to the edge of the tape. Additionally, the *nominal* position of the track locations would be known, and the nominal number of steps required to reach such nominal position would be known. Once the nominal number of steps to reach any track location are known, the actual location can be calculated by adding or subtracting the error, as may be determined in accordance with Table No. I above.

After the horizontal tray 234 is moved to the withdrawn position and the tape drive 10 is correctly mounted with respect to the stepper correction apparatus, the wiring connection transmits power to the motor 24 which lowers the head carriage assembly 72 to its lowermost displacement on the lead screw shaft 48. The lowermost displacement is reached when the projection 102 on the flange 100 of the central post 78 engages the projection 58 on the flange 56 at the base of the lead screw shaft 48. Once this lowermost displacement position has been reached, the head carriage assembly 72 and lead screw shaft 48 are both in a position to commence accurate settings for programming to the tape drive 10 actual distances to be traveled in order to reach a specific designated track on the magnetic tape.

From its lowermost displacement as described above, when projections 58 and 102 engage, the motor is directed to pass through a number of steps to raise the head carriage assembly 72 linearly to a point where it could read the edge of the magnetic tape. This distance, which is arbitrary for the present purposes because no magnetic tape is used, is determined by the stepper controller 276 and laser controller 278 and stored in the tape drive 10. Thereafter, the motor is programmed to move through a standard number of steps to move the nominal distance to the first track on the magnetic tape. The actual distance from the edge of the tape to all of the tracks on the magnetic tape is known. In this instance, in order to reach the first track, the tape head 74 is programmed to be raised a nominal distance, determined by the number of steps through which the motor must move to reach the track. Once the motor has moved through the designated number of steps and reached the nominal distance, the distance traveled by the tape head is measured by the laser interferometer. Since the actual position of the first track is known, and the distance moved by the head is determined by the interferometer, the stepper correction apparatus 200 is able to determine whether or not the tape head 74 is at the actual position of the first track. If not, as is likely to be the case, the error in position is determined by noting the difference between the actual distance and the nominal distance, as described above. The tape head is thereafter linearly displaced to compensate for the error between the actual distance and the nominal distance. The number of steps through which the motor must move to reach the actual distance is noted by the stepper controller 276 and laser controller 278, and in this way, it can accurately be determined the number of steps which the motor must move in order to travel the actual distance to the first track. The number of steps is programmed and stored in the tape drive for future use.

As an example, in order to travel the nominal distance from the edge of the tape to the first track, the motor may be programmed to move through 100 steps. However, in order to precisely overlie the track, the motor should have turned by 102 steps. Therefore, when the track and tape head are brought into accurate alignment by measurement as discussed above, the tape drive will be programmed to drive the motor through 102 steps in order to move the tape head from the edge of the magnetic tape to the first track.

The process is repeated for each of the tracks on the magnetic tape, whose actual distances are known from the edge of the tape. In this way, the tape drive will be custom programmed to move the motor in such a way that the number of steps required to actually place the tape head in alignment with the relevant track is known and used, as opposed to merely the nominal distance which may comprise an error.

When all of the track positions have been determined, and the tape drive programmed with respect to the number of steps to align with a particular track, the horizontal tray 234 can be moved to the extended position, the tape drive disconnected from the wiring connector 274, the reflector mounting bracket assembly 256 removed from the tape head, and the tape drive 10 is now available for use with a computer. In its subsequent use, each time a magnetic tape cassette is inserted into the tape drive, the carriage assembly will be moved to its lowermost displacement, and thereafter moved upwardly until it determines the position of the lower edge of the magnetic tape. With this position known and stored, information is already programmed into the tape drive on the number of steps the motor should move in order to reach a particular track on the magnetic tape, and the tape drive is able to calculate such distances based on the information which has been programmed.

We claim:

1. Apparatus for precise positioning of a tape head at a track on magnetic tape adapted to be received in a tape drive assembly having a memory and a motor, the apparatus comprising:
   a laser source for emitting a laser beam;
   a mounting tray for receiving the tape drive assembly;
   a reflector member for mounting on the tape head for movement therewith;
   means for directing the laser beam from the laser source to the reflector member;
   means associated with the laser source for accurately measuring a distance traveled by the tape head from a predetermined point to a position adjacent the track on the magnetic tape;
   means for determining an extent of movement of the motor for the distance traveled by the tape head; and
   programming means for programming the tape drive assembly with the extent of movement;

2. Apparatus as claimed in claim 1 wherein the laser source comprises a laser interferometer.

3. Apparatus as claimed in claim 1 wherein the mounting tray is moveable between a first position for loading with the tape drive assembly, and a second position wherein the head and reflector member are in a path of the laser beam.

4. Apparatus as claimed in claim 3 wherein the mounting tray includes locking means in the first and second positions for preventing movement of the tray.

5. Apparatus as claimed in claim 1 wherein the reflector member comprises an L-shaped bracket for placing on the tape head, a vertical wall, and a reflector tray at an upper end of the vertical wall for reflecting the laser beam.

6. Apparatus as claimed in claim 5 wherein the bracket includes a magnet to firmly hold the reflector member to the tape head.

7. Apparatus as claimed in claim 1 wherein the means for directing the laser beam comprises a prism.

8. Apparatus as claimed in claim 1 wherein the means for directing the laser beam comprises a beam bender.

9. Apparatus as claimed in claim 1 wherein the means for determining determines a number of steps or turns of the motor for the distance travelled, and said number of steps or turns are programmed into the memory of the tape drive assembly.

10. Apparatus as claimed in claim 1 wherein the predetermined point comprises an edge of the tape.

1. . Apparatus as claimed in claim 1 wherein the programming means programs the tape drive assembly memory with the extent of movement of the motor from the predetermined point to each track in the magnetic tape.

12. Apparatus as claimed in claim 1 further comprising a supporting member for supporting the means for directing the laser beam.

13. Apparatus as claimed in claim 1, further comprising mounting means having a granite base, a vibration isolator and a power supply.

* * * * *